United States Patent
Ahuja et al.

(10) Patent No.: US 6,411,603 B1
(45) Date of Patent: Jun. 25, 2002

(54) METHOD AND APPARATUS FOR PRICING LINKS/PATHS BASED ON A REQUESTED AMOUNT OF BANDWIDTH WHEREIN LINKS CAN BE LOAD BALANCED BY VARYING THEIR COSTS

(75) Inventors: Sudhir R. Ahuja, Aberdeen, NJ (US); Ioannis A. Korilis, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/122,032

(22) Filed: Jul. 23, 1998

(51) Int. Cl.$^7$ ............................................. G01R 31/08
(52) U.S. Cl. .................. 370/238; 370/395.21; 370/411
(58) Field of Search .......................... 455/445; 370/237, 370/238, 229, 248, 249, 252, 259, 260, 261, 400, 395.1, 395.2, 395.21, 411, 468, 477; 709/223, 224, 225, 226, 227, 241

(56) References Cited

U.S. PATENT DOCUMENTS

| | | | | |
|---|---|---|---|---|
| 5,359,593 A | * | 10/1994 | Derby et al. | 370/234 |
| 5,533,108 A | * | 7/1996 | Harris et al. | 379/201 |
| 6,055,571 A | * | 4/2000 | Fulp et al. | 709/224 |
| 6,101,180 A | * | 8/2000 | Donahue et al. | 370/352 |
| 6,134,235 A | * | 10/2000 | Goldman et al. | 370/352 |
| 6,141,325 A | * | 10/2000 | Gerstel | 370/238 |
| 6,230,203 B1 | * | 5/2001 | Koperda et al. | 709/229 |

* cited by examiner

*Primary Examiner*—David Vincent
(74) *Attorney, Agent, or Firm*—Ryan, Mason & Lewis, LLP

(57) ABSTRACT

In a communications arrangement where services requested by users are provided over a network, communication flow arising from the services are shared by multiple links in the network. The users are required to pay for use of the links to realize the respective services. A target operating point defining the desired amount of communication flow on each link is established. A pricing scheme in accordance with the invention is used to price each link on a per unit of flow basis. Each user elects use of the capacity of those relatively inexpensive links to fulfil the requested service to minimize the cost. Such optimization actions by the individual users give rise to a "routing game" leading to a Nash equilibrium which coincides with the target operating point. Thus, with the inventive pricing scheme, the target operating point is attained over time by virtue of the users' cost optimization actions.

29 Claims, 3 Drawing Sheets

100

METHOD AND APPARATUS FOR PRICING LINKS/PATHS BASED ON A REQUESTED AMOUNT OF BANDWIDTH WHEREIN LINKS CAN BE LOAD BALANCED BY VARYING THEIR COSTS

FIELD OF THE INVENTION

The invention relates to techniques for management of a network, and more particularly to a technique for allocating limited capacity of such a network for utilization by multiple users in accordance with a pricing scheme.

BACKGROUND OF THE INVENTION

It is common that users in a local area share use of a network to access a remote computer or server to realize different services, e.g., data transfer. Because the capacity or bandwidth of the network is usually limited, network management is oftentimes employed to allocate the limited network capacity among the users to realize such services. In obtaining the services, the users typically use their terminals which are connected to a source node of the network to access the server, which is connected to a destination node thereof. In a typical network, the source and destination nodes are connected by multiple links, which aggregately contribute the capacity which is required by the services.

In a prior art network management approach, the shares of the required capacity by the multiple links are determined based on a cost function. For example, the latter is a function of selected network performance objectives and quality of service (QOS) affordable to the users. The actual shares of the required capacity are determined by minimizing such a cost function.

SUMMARY OF THE INVENTION

We have recognized that the above-described prior art network management approach in which the cost function minimization dictates the actual shares of the required capacity by the links may not always be desirable, especially when a network provider wants to control such shares based on other criteria concerning, for example, maintaining a certain balance of communication load among the links, minimizing the overall congestion in the network, or reserving capacity of certain links.

The present invention is based on a notion that each service utilizing the links incurs an economic cost to the user requesting the service. That is, the user needs to pay for use of the links for the requested service. In accordance with the invention, the network provider is able to attain a pre-selected target operating point by assessing an appropriate cost to each user for his/her service. The target operating point defines the desired amount of capacity of each link for use. The cost is assessed based on a price which is a function of such a desired capacity amount of each link for use, and the total capacity amount of each link being used. To minimize the cost, each user most likely elects use of the capacity of those relatively inexpensive links to realize a service. Thus, in accordance with the invention, the aforementioned price is dispensed in such a way that it provides users with an incentive to utilize the links in a certain manner, thereby inducing an equilibrium of shares of the required capacity among the links, which coincides with the target operating point.

BRIEF DESCRIPTION OF THE DRAWING

In the drawing.

Throughout this disclosure, unless stated otherwise, like elements, components or sections in the figures are denoted by the same numeral.

DETAILED DESCRIPTION

Figure 1:
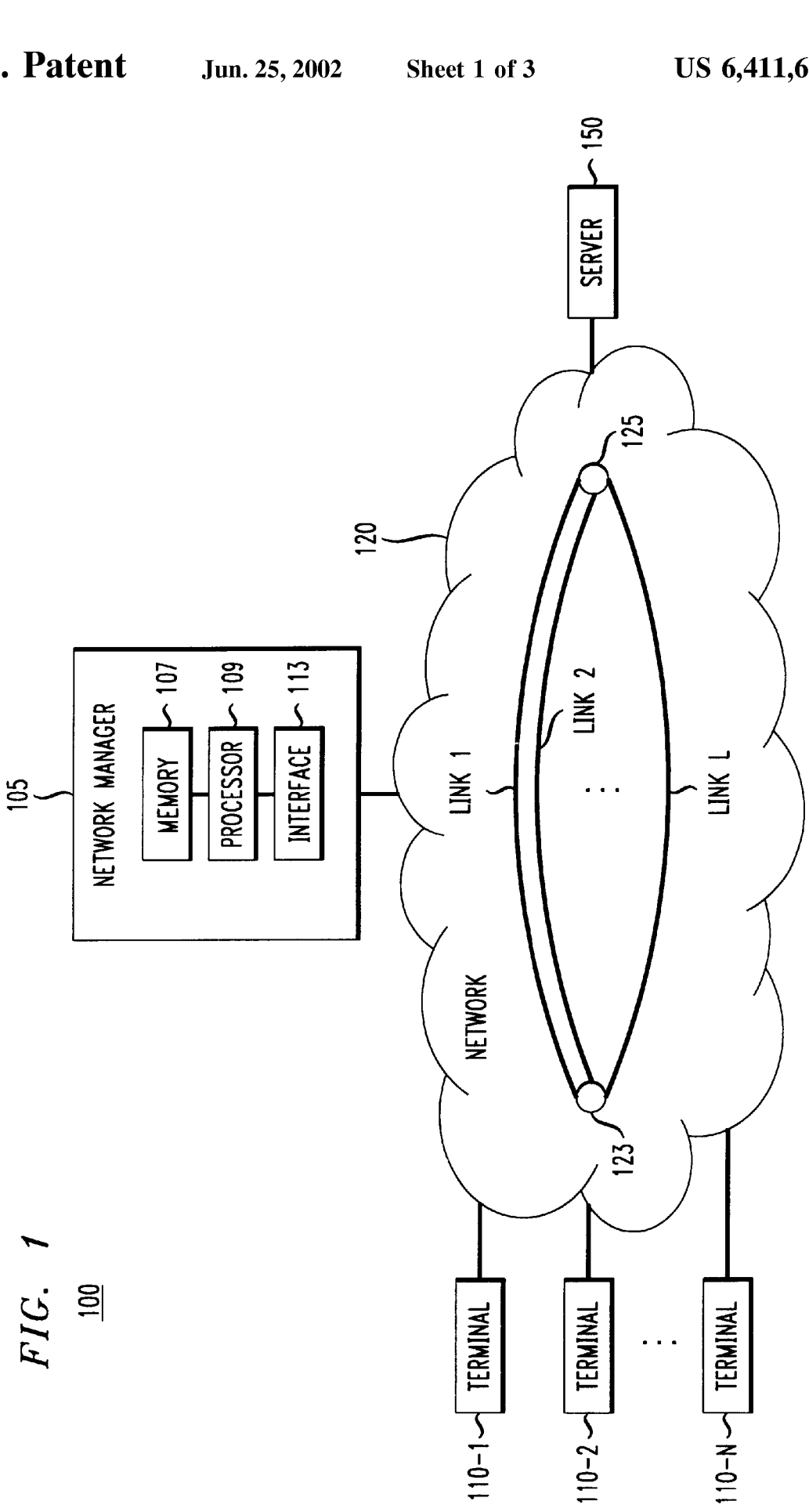
FIG. 1 illustrates a communications arrangement in accordance with the invention.

FIG. 1 illustrates communications arrangement 100 embodying the principles of the invention. In arrangement 100, users i, $1 \leq i \leq N$, may respectively utilize terminals 110-1 through 110-N to communicate with server 150, e.g., a host computer, through network 120 to realize different services, e.g., data transfer, where N is an integer greater than or equal to one. Without loss of generality, network 120 includes node 123 to which terminals 110-1 through 110-N are connected, and node 125 to which server 150 is connected. In addition, links 1 through L connect node 123 to node 125, where L is greater than or equal to one. For example, nodes 123 and 125 each may include a conventional router for directing communication flows between server 150 and terminals 110-1 through 110-N through links 1 through L, under the control of network manager 105 described below.

Typically, in realizing services requested by the users, links 1 through L aggregately contribute the bandwidth which is required by the services. In a prior art network management approach, the shares of the bandwidth by links 1 through L are determined by minimizing a cost function which is a function of selected network performance objectives and quality of service (QOS) affordable to the users. However, we have recognized that such a prior art approach in which the cost function minimization dictates the actual shares of the bandwidth by the links may not always be desirable, especially when a network provider wants to control such shares based on other criteria concerning, for example, maintaining a certain balance of communication flows among the links, minimizing the overall congestion in the network, or reserving capacity of certain links.

The present invention is based on a notion that each service utilizing network 120 incurs an economic cost to the user requesting the service. That is, the user needs to pay for use of network 120 for the requested service. For example, such a notion is disclosed in commonly assigned, copending U.S. patent application Ser. No. 09/012,866 filed on Jan. 23, 1998. In accordance with the invention, the network provider is able to attain a pre-selected target operating point F*, which is considered to be desirable, by assessing an appropriate cost to the user for each requested service, depending on, e.g., the availability of each link in the network. This target operating point defines the desired amount of communication flow traversing each link to realize all the services utilizing the network. Thus, in this instance $F^* = (f_1^* \ f_2^* \ \ldots \ f_L^*)$, where $f_1^*$ represents the desired amount of communication flow on link 1; $f_2^*$ represents the desired amount of communication flow on link 2; . . . ; and $f_L^*$ represents the desired amount of the communication flow on link L.

Specifically, in accordance with a pricing scheme described below, a price is set on a per unit of flow basis, which varies from link to link depending on, among others, the current communication flow thereon. As fully described below, a user is provided with information concerning the cost based on the price on each link for realizing a new service, which requires a certain volume of communication flow over network 120. To minimize the cost, the user tends to elect use of the capacity of those relatively inexpensive links to fulfil the service to which the service provider desires to steer the additional communication flow. Thus, in accordance with the invention, the aforementioned pricing scheme is used to provide the users with an incentive to utilize the links in a certain manner, thereby inducing an equilibrium of the shares of the aggregate flow among the links, which coincides with the aforementioned target operating point.

In order to fully appreciate the pricing scheme in accordance with the invention, we first consider the cost to a user utilizing network 120 to realize a service, which in this instance includes a performance cost and usage cost. The performance cost is based on the QOS provided to the user by each link k, $1 \leq k \leq L$, which depends on the current communication flow $f_k$ thereon. In this instance, $f_k$ may be expressed as follows:

$$f_k = \sum_{i=1}^{N} f_k^i,  \quad [1]$$

where $f_k^i$ represents the flow attributed to the service requested by user i, $1 \leq i \leq N$, on link k. In addition, the QOS varies with a function $T_k$ indicative of the congestion level on link k. Specifically, the higher the value of $T_k$, the lower is the QOS. In general, the function $T_k$ is a positive, convex increasing function of $f_k$, signifying that the congestion level increases with the flow thereon, and the link performance deteriorates increasingly as the flow approaches the capacity of the link. In this particular illustrative embodiment, $T_k$ is expressed as the average time delay on link k as follows:

$$T_k = \begin{cases} (c_k - f_k)^{-1}, & f < c_k \\ \infty, & f \geq c_k \end{cases}, \quad [2]$$

where $c_k$ represents the total capacity of link k. In this instance, the quality of service $QOS^i$ provided to user i by links 1 through L aggregately may be expressed as follows:

$$QOS^i = \sum_{k=1}^{L} f_k^i T_k. \quad [3]$$

In this instance, such $QOS^i$ represents the performance cost to user i.

The usage cost to user i for using the capacity of network 120 to realize the service is determined based on $p_k$, which represents the price for transporting a unit of flow on link k, $1 \leq k \leq L$. The unit price $p_k$ is a function of the amount of current communication flow $f_k$ on link k, but independent of user i. Thus, the service cost $J^i$ to user i consisting of the performance and usage costs for realizing the service may be expressed as follows:

$$J^i(f) = \sum_{k=1}^{L} f_k^i [T_k + p_k]. \quad [4]$$

The pricing scheme in accordance with the invention is designed to discourage the users from utilizing congested links. A simple implementation of such a scheme is to require the unit price $p_k$ to be proportional to the congestion level of link k. That is:

$$p_k = \phi_k T_k, \, 1 \leq k \leq L, \quad [5]$$

where $\phi_k$ represents a proportionality constant. Thus, based on expressions [2] and [5], the service cost $J^i$ to user i in expression [4] can be rewritten as follows:

$$J^i = \sum_{k=1}^{L} f_k^i w_k T_k = \sum_{k=1}^{L} f_k^i \frac{w_k}{c_k - f_k}, \quad [6]$$

where $w_k = 1 + \phi_k$. Since the price $p_k$ for transporting a unit of flow over link k is always greater than zero, $w_k$ must always be greater than zero.

Figure 2:
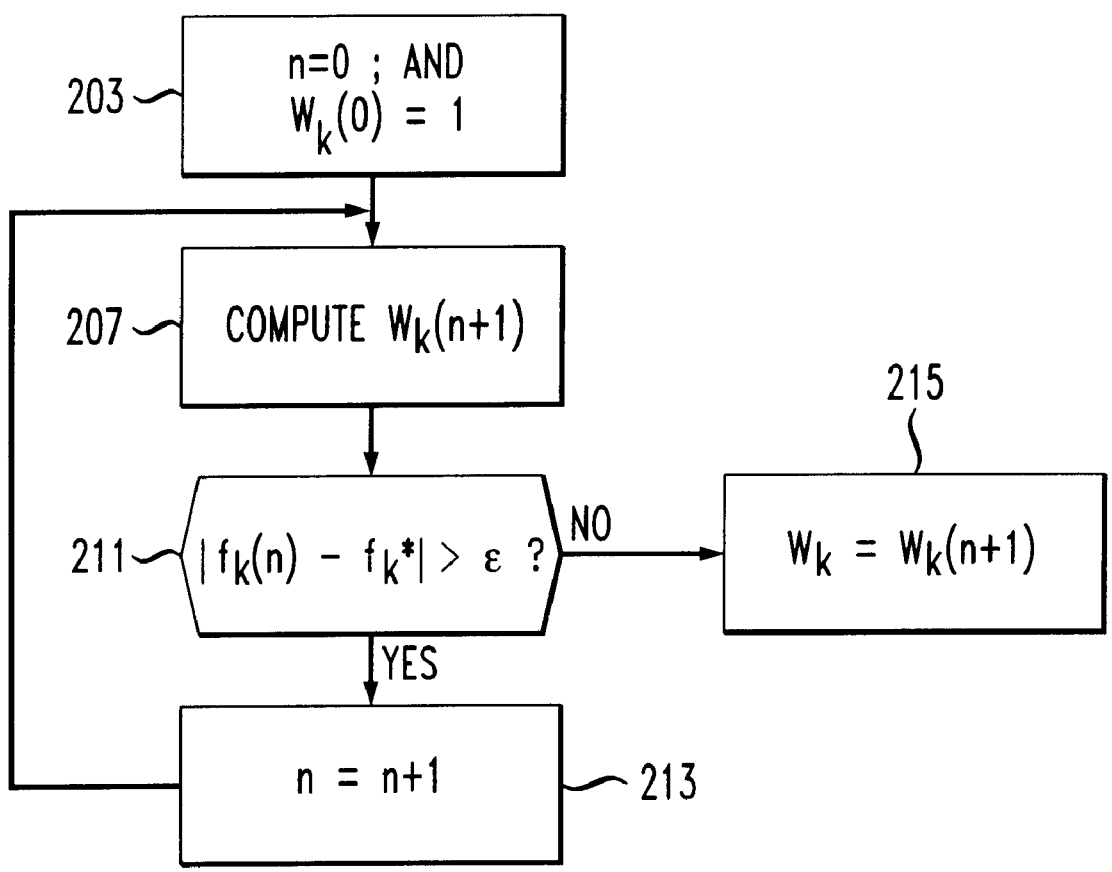
FIG. 2 is a flow chart depicting a process for determining certain factors relating to the cost for using a network in the arrangement of FIG. 1.

Network manager 105 in FIG. 1, among other things, determines $w_k$ for each link k necessary for computation of the service cost according to expression [6]. FIG. 2 illustrates routine 200, which is stored in memory 107 in manager 105, for determining such $w_k$ by processor 109. Specifically, routine 200 incorporates an iterative process, with its $n^{th}$ iteration defined as follows:

$$w_k(n+1) = w_k(n) e^{\theta_k (f_k(n) - f^*_k)}, \quad [7]$$

where $f_k(n)$ represents the observed flow currently measured by processor 109 on link k, which corresponds to $w_k(n)$ in the $n^{th}$ iteration, and $\theta_k$ represents a predetermined step size which in a well known manner determines the rate of convergence of the iterative process.

Instructed by routine 200, processor 109 initializes $w_k(n)$ in the n=0 iteration, e.g., setting $w_k(0)$ to 1, as indicated at step 203. Processor 109 at step 207 computes $w_k(n+1)$ according to expression [7]. Processor 109 then compares at step 211 $f_k(n)$ with the desired amount of flow on link k, i.e., $f_k^*$. If $f_k(n)$ is not close to $f_k^*$ within a predetermined tolerance, denoted $\epsilon$, which is a small number, e.g., $10^{-5}$, processor 109 increases n by one, as indicated at step 213, and routine 200 returns to step 207 from there. Otherwise, if $f_k(n)$ is close to $f_k^*$ within $\epsilon$, processor 109 sets $w_k$ to $w_k(n+1)$ as indicated at step 215, thereby determining $w_k$.

It should be noted at this point that with $w_k$ determined using routine 200, the cost function of expression [6] gives rise to a "routing game" leading to a well known Nash equilibrium, which in this instance represents the aforementioned target operating point F*. In this routing game, each user attempts to find a routing strategy which minimizes his/her cost. The optimization attempt of the user is affected by the routing strategies of other users. As a result, each user dynamically devises his/her routing strategy subject to the similar action by other users to minimize his/her cost. Such dynamic user actions can be modeled as a non-cooperative game which leads to the Nash equilibrium, from which no user finds it beneficial to deviate unilaterally. By design, the inventive pricing scheme described above causes the Nash equilibrium to coincide with the target operating point. Thus, using the pricing scheme, the target operating point is attained over time when the communication flows on links 1 through L settle.

It should also be noted that based on expression [6], the aforementioned $w_k$ can be envisioned as a cost discount factor of link k, $1 \leq k \leq L$. If the service provider increases the discount factor of a particular link, and thus the cost of using that link, the users would reactively move communication flow from such a link to the other links to minimize the service cost. Moreover, it can be shown that when each of the discount factors $w_1, w_2, \ldots$, and $w_L$ is multiplied by the same positive number, the Nash equilibrium of the aforementioned routing game remains the same. That is, what determines the characteristics of the routing game is the relative values of $w_k$'s. In other words, the relative values of the discount factors are what control the users' behavior in formulating their routing strategies. As a result, the network provider can scale up or down the discount factors simultaneously to adjust the service cost, without affecting the realization of the target operating point.

More importantly, in general, it can be shown that as long as the users are concerned about the relative discount factor values in formulating their routing strategies to minimize the service cost, which is reasonable, the users' actions can always be modeled as a routing game leading to a Nash equilibrium which coincides with a target operating point. The set of discount factors corresponding to the target operating point may be obtained using routine 200 above, regardless of what the actual cost functions of the users are.

Referring back to FIG. 1, when user i, $1 \leq i \leq N$, at terminal 110-i requests a new service from server 150 which requires certain capacity, terminal 110-i transmits a request for such a service to network manager 105 through network 120. Upon receiving the request through interface 113, processor 109 determines, among other things, the available capacity, and the aforementioned congestion level $T_k$ and discount factor $w_k$ of each link k, $1 \leq k \leq L$, and provides information concerning same to terminal 110-i. Based on the provided information, user i or terminal 110-i can determine the allocation of the required capacity among the links, i.e., $f_k^i$ in the cost function of expression [6], depending on the user's budget and service requirements such as delay tolerance. Alternatively, processor 109 may determine such an allocation if the service request also includes the user's budget and service requirements. In any event, once the allocation is determined, processor 109 causes nodes 123 and 125 to route the communication flow between terminal 110-1 and server 150 over links 1 through L accordingly to realize the service.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

Figure 3:
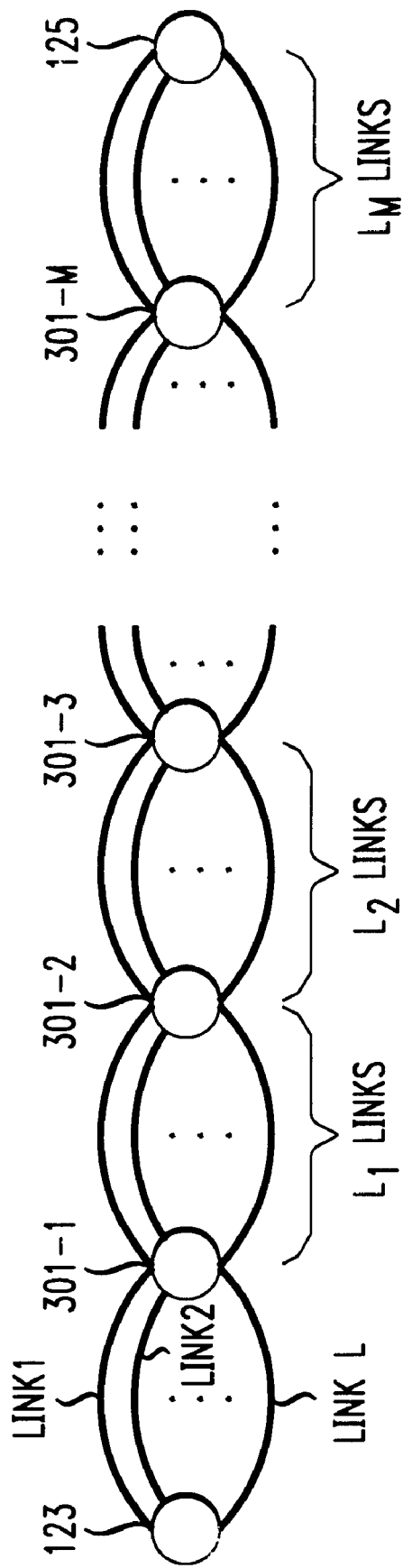
FIG. 3 illustrates a general network to which the invention is also applicable.

For example, in the illustrative embodiment, terminals 110-1 through 110-N are connected to server 150 via source node 123 and destination node 125. It will be appreciated that the connections therebetween may be via additional intermediate nodes as illustrated in FIG. 3. For example, such intermediate nodes are denoted 301-1 through 301-M in FIG. 3, where M is an integer greater than or equal to one. Illustratively, the aforementioned set of L links connect node 123 to node 301-1. Similarly, a set of $L_1$ links connect node 301-1 to node 301-2; a set of $L_2$ links connect node 301-2 to node 301-3; . . . ; and a set of $L_M$ links connect node 301-M to node 125, where L, $L_1, L_2, \ldots$ and $L_M$ may or may not have the same value. In that case, to realize a service from server 150, capacity from one or more links in each set is required. The inventive process of pricing and allocating the required capacity among links 1 through L described before is repeated here for each set, with the service cost associated with each set being additive.

Finally, network manager 105 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for managing a network including a plurality of links each having capacity for transportation of information, the apparatus comprising:
   an interface for receiving a request for a service which will utilize at least one of the links, the service incurring a cost; and
   a processor for assigning prices for the links, the cost varying with at least the prices, the prices assigned based on a desired amount of communications flow to be achieved for each of the links when the service is assigned the at least one link in order to minimize cost according to the prices.

2. The apparatus of claim 1 wherein the cost also varies with an amount of information concerning the service.

3. The apparatus of claim 1 wherein the cost also varies with quality of the service.

4. The apparatus of claim 1 wherein each price assigned to a link is based on a factor, and wherein the processor is adapted to simultaneously scale each of the factors in order to adjust the cost, but wherein scaling the factors does not change the pre-determined operating point.

5. The apparatus of claim 1 wherein the service includes data transfer.

6. The apparatus of claim 1 wherein the processor includes the interface.

7. A communications arrangement including a network having a plurality of links for providing at least one service, the arrangement comprising:
   an interface for receiving a request for a selected service; and
   a processor for selecting a subset of the plurality of links to realize the selected service, the processor assigning prices for the links based on a desired amount of communications flow to be achieved for each of the links when the service is assigned the at least one link in order to minimize cost according to the prices.

8. The arrangement of claim 7 wherein the network includes a plurality of nodes, and the plurality of links connect the plurality of nodes to one another.

9. The arrangement of claim 8 wherein at least one of the nodes includes a router for routing information.

10. The arrangement of claim 7 wherein the processor includes the interface.

11. A system for providing at least one service comprising:
    a plurality of means for transporting information concerning the at least one service;
    means for computing a price for using each of the transporting means, the prices computed based on a desired amount of communications flow to be achieved for each of the transporting means when the service is assigned the at least one link in order to minimize cost according to the prices; and
    means for determining the cost for the at least one service, the cost varying with at least the prices.

12. The system of claim 11 wherein the determining means includes a terminal.

13. The system of claim 11 wherein each transporting means includes a portion of a network.

14. The system of claim 11 wherein the cost also varies with an amount of the information concerning the at least one service.

15. The system of claim 11 wherein the cost also varies with quality of the at least one service.

16. The system of claim 11 wherein each price assigned to a transporting means is based on a factor, and wherein the means for computing is adapted to simultaneously scale each of the factors in order to adjust the cost, but wherein scaling the factors does not change a pre-determined operating point, the predetermined operating point based on the desired amount of communications flow for each of the transporting means.

17. Software including machine readable instructions stored in a tangible medium for performing a process for receiving a service from a network, the network including a plurality of links each having capacity to transport information, the process comprising:

receiving a signal representative of a request for the service which utilizes at least one of the links; and in response to the signal, determining prices for the links, the prices based on a desired amount of communications flow to be achieved for each of the links when the service is assigned the at least one link in order to minimize cost according to the prices;

wherein the service incurs a cost, the cost being a function of at least the prices.

18. A method for managing a network including a plurality of links each having capacity for transportation of information, the method comprising:

receiving a request for a service which utilizes at least one of the links;

determining prices for the links, the prices determined based on a desired amount of communications flow to be achieved for each of the links when the service is assigned the at least one link in order to minimize cost according to the prices; and assigning the service a cost, the cost varying with at least the prices, wherein the assigned cost is assigned to minimize cost according to the prices.

19. The method of claim 18 wherein the cost also varies with an amount of information concerning the service.

20. The method of claim 18 wherein the cost also varies with quality of the service.

21. The method of claim 18 wherein each price assigned to a link is based on a factor, and wherein the method further comprises the step of simultaneously scaling each of the factors in order to adjust the cost, but wherein the step of scaling does not change the pre-determined operating point.

22. The method of claim 18 wherein the service includes data transfer.

23. A method for use in a communications arrangement including a network having a plurality of links for providing at least one service, the method comprising:

pricing each of the links based on a desired amount of communications flow to be achieved for each of the links when a service is assigned at least one link in order to minimize a first cost according to the prices; and selecting a subset of the plurality of links to realize a selected service, the selected service incurring a second cost.

24. The method of claim 23 wherein the subset of the plurality of links is selected to minimize the cost, whereby the first and second costs are the same.

25. The apparatus of claim 1, wherein the prices are assigned to cause a pre-determined operating point to be approached or attained, the pre-determined operating point based on the desired amount of communications flow for each of the number of links.

26. The apparatus of claim 1, wherein the processor is adapted to determine an allocation for the service, the allocation comprising an amount of capacity for the service on each of the least one links, the allocation minimizing cost for the service.

27. The arrangement of claim 7, wherein the processor is adapted to determine an allocation for the service, the allocation comprising an amount of capacity for the service on each of the subset of links, the allocation minimizing cost for the service.

28. The method of claim 18, wherein the prices are determined to cause a pre-determined operating point to be approached or attained, the pre-determined operating point based on the desired amount of communications flow for each of the number of links.

29. The method of claim 18, further comprising the step of determining an allocation for the service, the allocation comprising an amount of capacity for the service on each of the least one links, the allocation minimizing cost for the service.

* * * * *